United States Patent [19]
Lethbridge

[11] Patent Number: 5,939,639
[45] Date of Patent: Aug. 17, 1999

[54] PRESSURE TRANSDUCER HOUSING WITH BAROMETRIC PRESSURE ISOLATION

[75] Inventor: Paul Lethbridge, Andover, Mass.

[73] Assignee: Setra Systems, Inc., Boxborough, Mass.

[21] Appl. No.: 08/984,784

[22] Filed: Dec. 4, 1997

[51] Int. Cl.$^6$ ........................................................... G01L 9/12
[52] U.S. Cl. ................... 73/724; 73/706; 73/718; 73/756; 361/283.3; 361/283.4
[58] Field of Search .............................. 73/706, 718, 724, 73/756; 361/283.3, 283.4

[56] References Cited

U.S. PATENT DOCUMENTS

| | | | |
|---|---|---|---|
| 3,557,621 | 1/1971 | Ferran | 73/398 |
| 4,823,603 | 4/1989 | Ferran et al. | 73/724 |
| 5,271,277 | 12/1993 | Pandorf | 73/724 |
| 5,329,819 | 7/1994 | Park et al. | 73/724 |
| 5,343,757 | 9/1994 | Tate | 73/718 |
| 5,396,803 | 3/1995 | Ferran | 73/724 |
| 5,442,962 | 8/1995 | Lee | 73/718 |
| 5,515,711 | 5/1996 | Hinkle | 73/4 V |

*Primary Examiner*—William Oen
*Attorney, Agent, or Firm*—Peter J. Manus, Esq.

[57] ABSTRACT

A circular membrane diaphragm is edge-mounted on a generally cylindrical housing structure that allows the diaphragm to deform when a differential pressure is applied across it. The housing structure also supports a circular electrode in an internal chamber and in close proximity to the back surface of the diaphragm to form a variable capacitor. The outer side of the membrane is exposed to a second chamber defined by the housing structure and a cover. A tube connects the second chamber to a gas whose pressure is to be measured. The back of the housing structure is exposed to atmospheric pressure and other ambient atmospheric conditions. The housing structure is characterized by double flanges spaced axially by a deep lateral groove. A central cylindrical boss extends axially from the back side of the housing. The outer diameter B of the boss is at least equal to the diameter E of the groove. This housing structure provides the membrane with a high degree of isolation from external pressure fluctuations. A feedthrough assembly to the electrode is centrally located in the housing. For vacuum and absolute pressure measurements, a sealable vacuum conduit and a chemical getter assembly are also mounted in the central portion of the housing.

10 Claims, 7 Drawing Sheets

PRESSURE TRANSDUCER HOUSING WITH BAROMETRIC PRESSURE ISOLATION

FIELD OF THE INVENTION

This invention relates in general to diaphragm-type capacitive pressure transducers. More specifically, it relates to a housing structure that isolates the diaphragm as well as a capacitive gap formed by the diaphragm and an electrode from the mechanical stresses produced by barometric changes.

BACKGROUND OF THE INVENTION

Capacitive pressure sensors are well known. They typically include a fixed element having a rigid, planar conductive surface forming one plate of a substantially parallel plate capacitor. A deformable conductive member, such as a metal foil diaphragm, forms the other plate of the capacitor. Generally, the diaphragm is edge-supported so that the central portion is substantially parallel to and opposite the fixed plate. Since the sensor generally has the form of a parallel plate capacitor, the characteristic capacitance of the sensor changes in relation to changes in the gap g between the diaphragm and the conductive surface of the fixed element. Reducing the gap increases the capacitance, albeit not necessarily with a linear relationship. A pressure differential applied across the diaphragm causes the diaphragm to deflect and the gap to change as a function of the pressure differential. For an edge mounted diaphragm, the deformation typically approximates a parabola. U.S. Pat. No. 5,442,962 to S. Y. Lee and assigned to Setra Systems, Inc. is illustrative of this general approach.

Capacitive pressure transducers are also known for measuring the pressure of a vacuum, e.g., the vacuum generated in the process chamber of semiconductor manufacturing equipment. Vacuum measurement is often absolute—one side of the diaphragm is evacuated to a hard, near absolute vacuum (a typical value being $1 \times 10^{-9}$ Torr).

Such devices, however, are highly susceptible to error arising from 1) variations in the ambient barometric pressure acting on the exterior of the transducer, 2) other external mechanical stresses such as torques or moments produced when the transducer is connected to a system, or when printed circuit boards are attached to the transducer, 3) vibrations such as those produced by a vacuum pump equipment connected to the system, 4) mechanical shock, and 5) changes in temperature causing thermal expansion and contraction.

The changes in the capacitive gap being measured are minute, e.g. $10^{-9}$ inch, and the diaphragm is extremely sensitive to stresses which can seriously reduce the accuracy and reliability of the gap measurements. Fluctuations in barometric pressure (a maximum variation being about ±1.5 inch of Mercury, 38 Torr) can produce a mechanical deformation of the housing which is transmitted to the diaphragm. The "fixed" electrode can also move in response to mechanical stresses introduced by barometric changes, particularly if it is mounted, directly or indirectly, on a housing component that is exposed on one side to ambient pressure and on the other to a vacuum. Deformations of the housing in the range of $1 \times 10^{-5}$ inch to $1 \times 10^{-7}$ inch are typical in response to barometric pressure changes of ±1.5 inch of Mercury. This is significant when it is desirable to resolve variations in the capacitive gap on the order of $1 \times 10^{-9}$ inch. Ideally the precision of the measurement is ±0.25% or less of the reading.

A straight forward solution is to make the housing structure thicker, and therefore more rigid. However, this leads to a device which is large, cumbersome, and costly to manufacture. Material costs are high because sophisticated, expensive materials such as nickel-based alloys with good corrosion resistance and low coefficients of thermal expansion are typically required. Such materials are currently four to five times the cost of typical 300 series stainless steels.

U.S. Pat. No. 5,271,277 to Pandorf, U.S. Pat. No. 5,515,711 to Hinkle, and U.S. Pat. Nos. 4,823,603 and 5,396,803 to Ferran describe prior art capacitive, edge-mounted diaphragm devices which were designed to measure vacuum, or later adapted for this application. They deal with the movement of the housing in response to barometric pressure changes by 1) supporting the "fixed" electrode on a ceramic disc separate from the backplate of the housing exposed to ambient pressure and 2) supporting the diaphragm on a ring that is in turn supported from the backplate at its outer edge (where there is less movement than at its center). Connections to the electrode are made by feedthroughs in the backplate. The ceramic plate is typically spring loaded against the backplate by a stiff annular spring member to control the spacing between the plate and the diaphragm by strongly clamping them together.

The '603 Ferran patent also deals with the problem of mechanical hysteresis during movement of the ceramic disc with respect to metal parts supporting the disc. It teaches supporting the ceramic disc at its side on a set of sapphire roller bearings. This helps the hysteresis, but it is not rugged, and it has obvious cost and assembly disadvantages—beyond the cost and assembly disadvantages of the ceramic disc itself.

It is therefore a principal object of the invention to provide a housing structure for a capacitive pressure transducer which itself provides a high level of isolation of the diaphragm and the diaphragm-to-electrode gap from stresses induced by variations in the ambient barometric pressure.

A further principal object is to provide a high degree of isolation from all mechanical stress, including temperature-induced stress.

Another principal object is to provide this isolation with a compact, rugged structure that has a low cost of manufacture as compared to currently available commercial transducers with comparable operational capabilities.

SUMMARY OF THE INVENTION

A housing structure for a pressure transducer, particularly a high precision transducer useful to measure pressure (absolute/differential) as low as $1 \times 10^{-5}$ Torr, is in the form of a generally cylindrical plate with a central boss (or hub) on its outer surface, a deep lateral groove forming first and second flanges, a counterbore in the boss to accommodate a feedthrough, and at least one counterbore in the first flange. A fixed electrode, typically a metallic disc, is located in the first flange counterbore and supported on a metallic post that extends through the center of the housing structure and sealed in a dielectric material that electrically isolates the electrode from the housing. The outer edge of the first flange edge-mounts a thin, elastic diaphragm in a closely spaced relationship with the electrode to form a capacitor. The diaphragm and first flange form a first chamber which, for an absolute pressure gauge, is maintained at a hard or near absolute vacuum. A cover is sealed to the housing structure over the diaphragm to form a second chamber. A tube connected to the cover directs the gas whose pressure is to be measured to the second chamber where it deforms the diaphragm to degree that corresponds to the applied pressure.

The second flange of the housing structure is preferably sealed at its edges to the cover. It is sufficiently thin, and the groove is sufficiently deep, that this flange sacrificially takes up the deformation in the housing structure produced by the ambient pressure acting on its outer face. The thinness of the second flange also enhances thermal isolation of the diaphragm. The radius of the first flange is preferably somewhat smaller than that of the second flange to create a lateral spacing between the first flange mounting the diaphragm and the cover.

Mechanical isolation of the diaphragm and diaphragm-to-electrode gap is dramatically enhanced when the diameter B of the boss is at least equal to the diameter E of the groove (groove bottom to groove bottom). It is preferably somewhat larger. It has been found that mechanical isolation is also enhanced when: 1) the diameter E is about 60±3% of the diameter F of the first flange; 2) the height H of the housing structure, measured axially from the outer face of the boss to the inner face of the first flange, is in the range of about 30 to about 50% of the diameter F; and 3) the thickness $T_3$, measured axially at its outer edge, of the first flange is at least twice the thickness $T_2$ of the groove, also measured axially. With this construction, barometric pressure changes of as much as ±1.5 inch of Mercury produce a variation of the gap g of less than $5 \times 10^{-8}$ inch, for a housing diameter of 2.0 inches. For housing diameters less than 4.0 inch, typically values for gap variation are lower than $1 \times 10^{-7}$ inch.

These and other features and objects of the invention will be more fully understood from the following detailed description which should be read in light of the accompanying drawings.

DETAILED DESCRIPTION OF THE PREFERRED EMBODIMENTS

Figure 1:
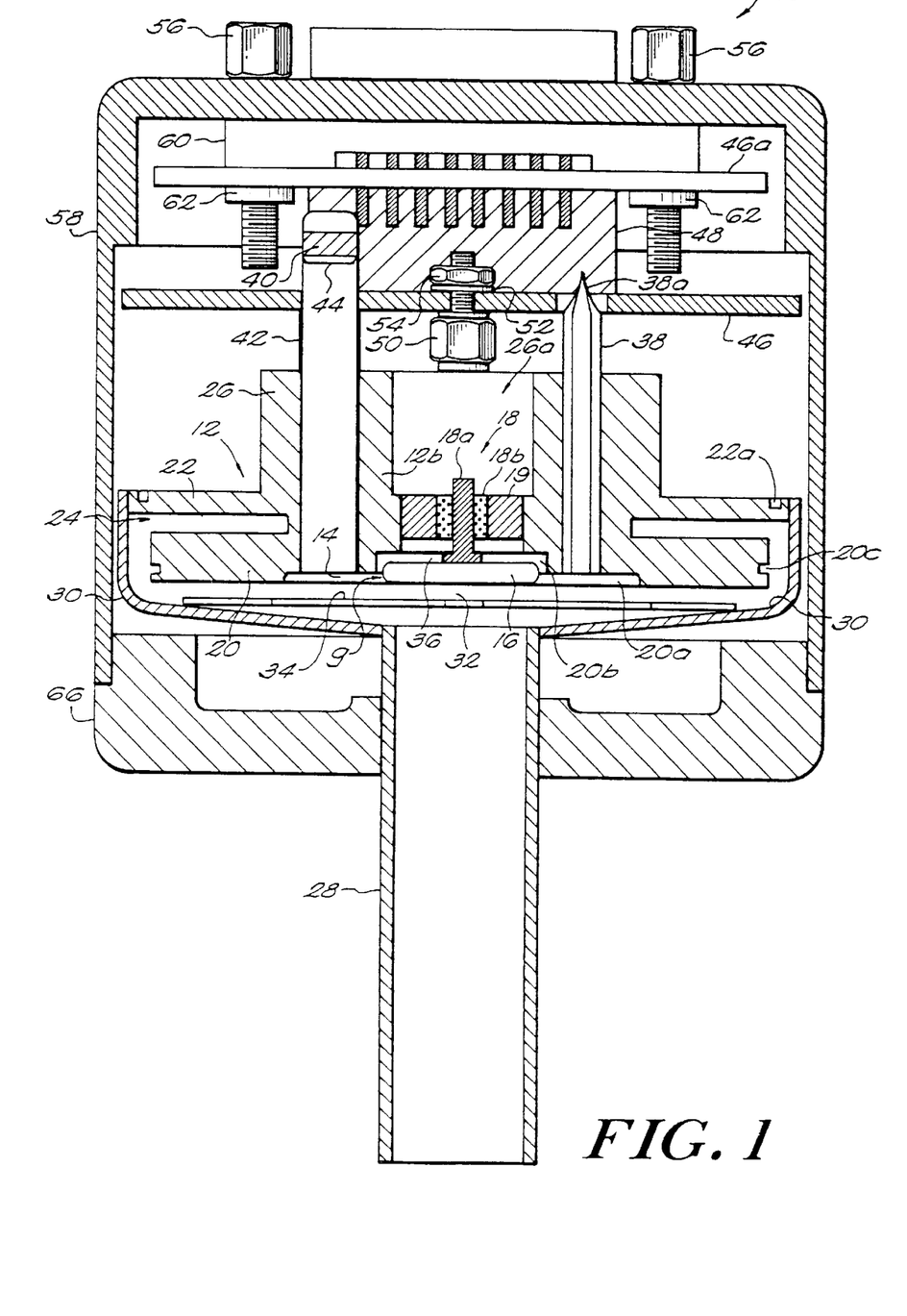
FIG. 1 is a view in vertical section of a pressure transducer using a housing according to the present invention.
Figure 2:
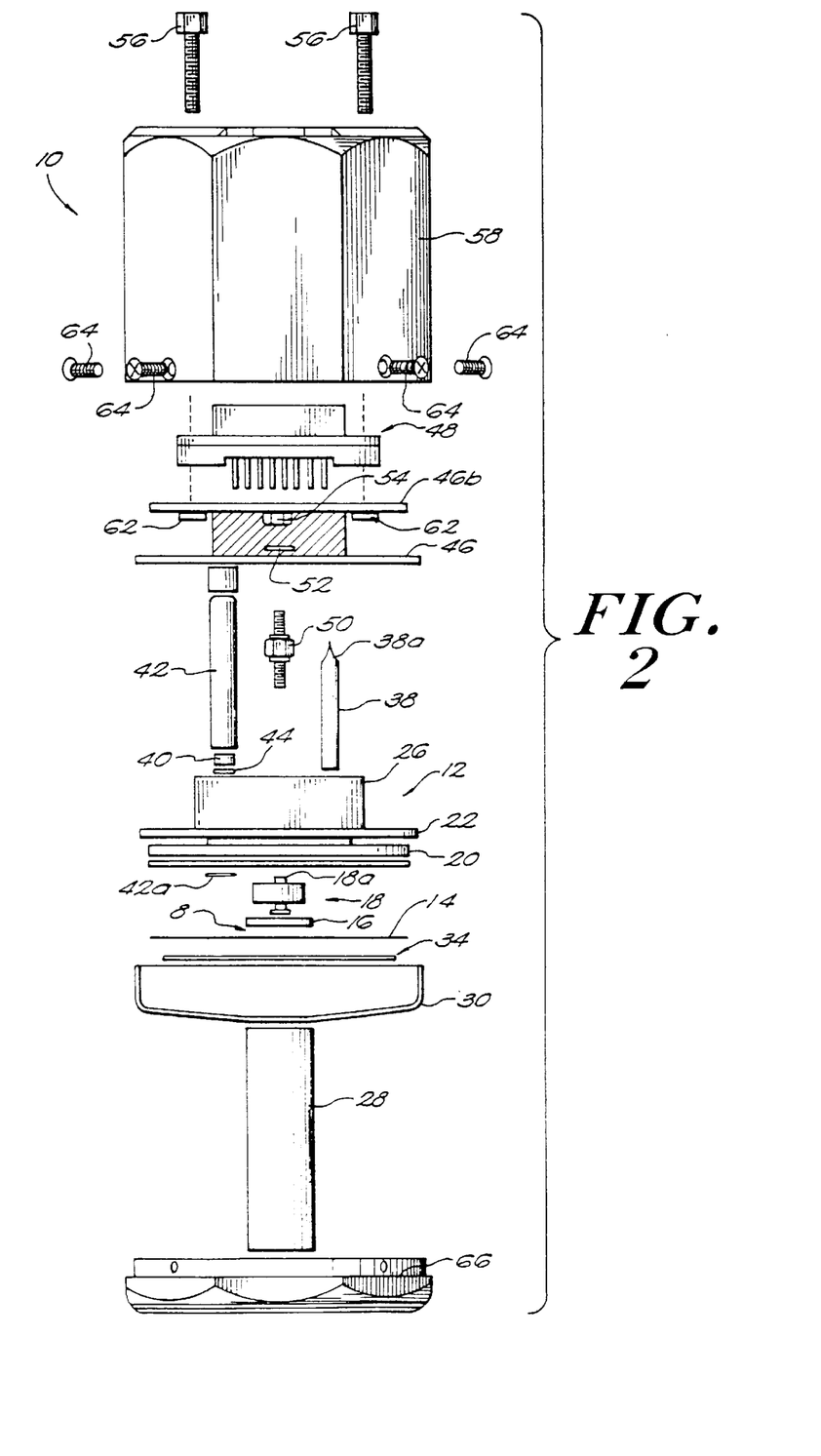
FIG. 2 is an exploded view in side elevation of the transducer shown in FIG. 1.

FIGS. 1 and 2 show a capacitive pressure transducer 10 using a housing structure (hereinafter "housing") 12 constructed according to the present invention to mount a diaphragm 14 and a fixed electrode plate 16 with a gap g therebetween. A standard feed-through assembly 18 with a metallic post 18a and a surrounding dielectric/insulating sleeve 18b supports the plate. A stainless steel ring 19 welded within a central opening 12a in the housing 12 is adhered to the sleeve 18b. The post 18d provides an electrical connection to the electrode plate 16, which is typically a flat metal disc, especially for plates with a diameter of 0.5 inch or smaller. It can, of course, take other forms such as a metallic coating deposited on a dielectric substrate. The plate 16 can also be curved to match more closely the shape of the diaphragm when it deforms in use. A curved plate where the curvature mirrors that of the diaphragm when deflected in response to the pressure to be measured is more likely to be useful where the plate diameter is in excess of 0.5 inch.

The housing 12 includes a first or "lower" flange 20, a second or "upper" flange 22, a lateral groove 24, a boss 26, a counterbore 26a in the boss, and counterbores 20a and 20b in the first flange. As shown, the housing 12 is preferably formed as an integral, homogeneous structure machined from a single piece of material. The material preferably is highly rigid, resistant to corrosion by process gases it may contact, and exhibits a low coefficient of thermal expansion. Also, the material must be matched to the thermal coefficient of the material forming the diaphragm. The nickel chromium alloy sold by Inco Alloys under the registered trade designation Inconel is preferred for its cost and availability in thin sheet form to be used for the diaphragm. Inconel, however, is relatively dense, very hard (Rockwell hardness of 80), and thus difficult to machine. The thermal properties of the diaphragm need to be a close match to the housing in order to improve the thermal stability of the device. A diaphragm thickness in the range 0.0005 to 0.003 inch is used in the present invention to measure absolute pressures. Diameters are in the range 2.0 to 4.0 inches. The first counterbore 20a facilitates free movement of the diaphragm in response to an applied pressure. The second counterbore 20b provides room for the electrode disc 16. The size of the counterbores should be sufficient only to serve these functions because, in general, counterbores in the flange 20 detract from the performance of the housing.

Gas or other fluid from a pressure or vacuum system whose pressure is to be measured is conducted by pressure tube 28 and cover (or tube flange) 30 to a first enclosed chamber 32 where the pressure acts on the outer face of the diaphragm 14. The inlet cover 30 is welded or otherwise continuously and reliably sealed to the outer edge of the second housing flange 22. A small weld preparation groove 22a (FIG. 1) facilitates this weld. Welding groove 20c likewise facilitates the welding of the diaphragm to the first flange 20. (Welded construction is preferred for vacuum application; it is not required for other applications.) As best seen in FIG. 1, the cover 30 has a conical shape in the region surrounding the tube 28.

A shield plate 34 (FIGS. 1, 2, 11 and 12) is welded over the pressure tube 28 using a set of co-planar, peripheral, mutually-spaced legs 34a each welded or otherwise secured to the cover 30 at their tips. The plate 34 shields the diaphragm 14 from a direct inflow of the gas, as well as from heat, radiation and condensation of materials present in the process chamber or gas flow. It also distributes the gas flow. The degree of inclination of the conical portion of the cover 30 is coordinated with the diameter of the plate 34 and the radial length of the legs 34a so that there are clearances between the cover 30 and the plate 34 over their opposing faces and in the peripheral regions between the legs 34a. These clearances provide a fluid communication path between the tube 28 and the chamber 34.

A second chamber 36 is formed by the flange 20, particularly the counterbores 20d and 20b, the diaphragm 14, the electrode assembly 18, and the surrounding central portions 12b. For absolute pressure measurements, the chamber 36 is evacuated to a high vacuum, e.g., $1\times10^{-9}$ Torr. A known-type of vacuum tube 38 of a cold fusible material (e.g., extremely pure oxygen-free copper) is connected to a system used to pump down the chamber while the assembly is heated, to out-gas the chamber. A chemical getter 40 of known design mounted in a housing 42 with a split ring 44 is activated, e.g., by heating. After activating the getter the tube 38 is pinched off at 38a by crimping the tube in a controlled manner (cold welding it). The getter maintains the high vacuum in the chamber 36 for years (e.g., 10–15 years). The tube 38 and getter housing 40 are welded into holes 12d and 12e drilled axially through the central portion 12c of the housing. Of course, the tube 38 and getter 40 are not used in non-vacuum applications. A filter screen 44a may be placed over the getter tube to block particles generated by the getter.

Conventional electronics to amplify and process the signal produced by the capacitor are mounted on a p.c. board assembly 46. A connector portion 46a with plated-through connector holes connects electrically to a main p.c. board by a flexible neck portion containing conductors folded around a spacer block 48. A pair of stand offs 50 thread into the boss and secure the p.c. board 46 with washers 52 and nuts 54. Screws 56 pass through a cover 58 and a connector 60 to secure the connector to the connector portion 46a of the p.c. board assembly when nuts 62 are tightened. Screws 64 secure the cover 58 to a cover base 66.

When the pressure in chambers 32 and 36 are equal the diaphragm remains in an un-deflected state. A pressure differential will cause the diaphragm to deflect either towards or away from the electrode disc increasing or decreasing the gap g.

In this invention the diaphragm is intended to measure pressure differentials where the pressure in chamber 32 is greater than that in chamber 36 so that with increasing pressure differential the gap between the electrode 16 and diaphragm 14 decreases. At large pressure differentials the diaphragm will contact the electrode disc 16 and interior surface of the first or "lower" flange 20. It will conform to the surface. The interior surface of the lower flange is contoured to provide maximum support for the diaphragm when this over-pressure condition occurs.

Figure 8:
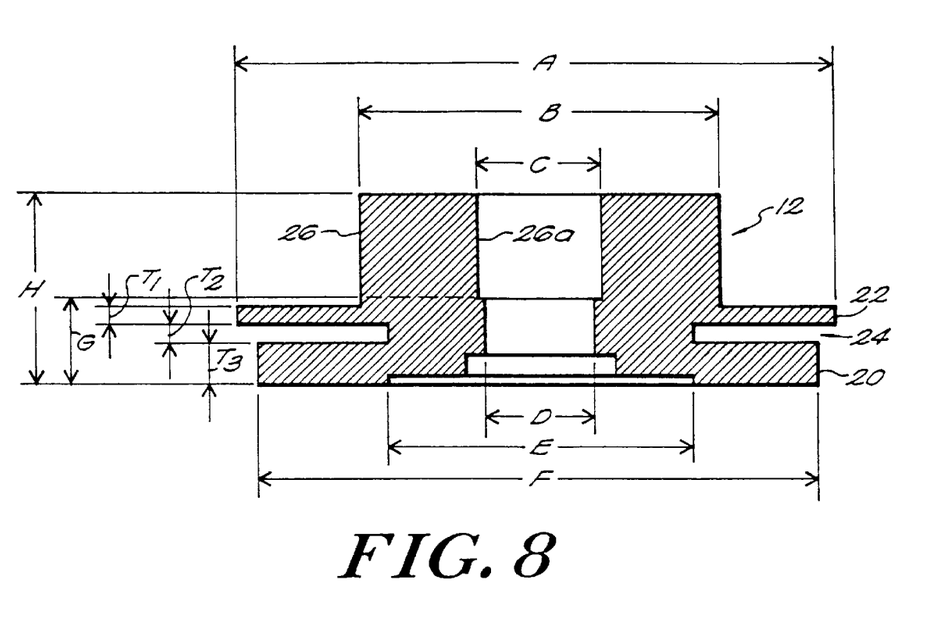
FIG. 8 is a view of the housing structure corresponding to FIG. 7 but showing only the housing structure and dimensional notations.

The exterior surfaces of the second or "upper" flange 22, boss 26, feedthrough assembly 18, inlet cover 30 and tube 28 exposed to atmospheric pressure. The housing is therefore exposed to a differential pressure across the top flange 22 between the boss 26 and the chamber 36. A differential between atmospheric pressure and chamber 32 will cause the upper flange 22, and to a lesser extent the boss 26, to deflect as shown in FIG. 8. Since the upper flange by and boss 26 have a relatively thick section, the amount of deflection for a given pressure differential is extremely small compared to the diaphragm 14. The annular groove 24 and the relative dimensions of the lower flange 20, upper flange 22 and boss 26 are chosen so as to minimize the relative deflection of the edge of the lower flange 20 with respect to the central electrode disc or plate 16. The radius of the boss 26 and the depth and width of the groove 24 provide an annular pivot region that prevents the bending moment of the upper flange 22 from being transmitted to the lower flange 20. Thus, although the lower flange 20 and feedthrough assembly 18 move simultaneously, there is substantially no relative movement between them. Hence the diaphragm-to-electrode gap g remains substantially constant as the ambient atmospheric pressure changes (assuming that the system pressure at inlet 28 is also constant).

In a typical low differential pressure measurement the diaphragm may be 0.001 inch thick. The diaphragm-to-electrode gap is 0.005 inch. A pressure differential of 0.2 psi (10 Torr) will cause the diaphragm to deflect approximately 0.003 inch. If the electrode to diaphragm gap changes by $10^{-6}$ inch, then assuming a linear system, this would represent 0.03% full scale (FS) error. However, if a pressure differential of 0.002 psi (0.1 Torr) was being measured by the same transducer the same gap change would represent a 3% reading error. This level of error is not acceptable in the intended application for this invention.

Using the "isolated flange" design of the present invention reduces the relative deflection of the lower flange 20 to the central electrode disc 16 from $7.5\times10^{-7}$ inch to $4.26\times10^{-8}$ inch for a 1.5 psi change in barometric pressure. This represents a 17.6 reduction in the electrode gap change. The comparison is made with a solid housing, of the same material without the groove and flange features, and having the same diameter.

Figure 9:
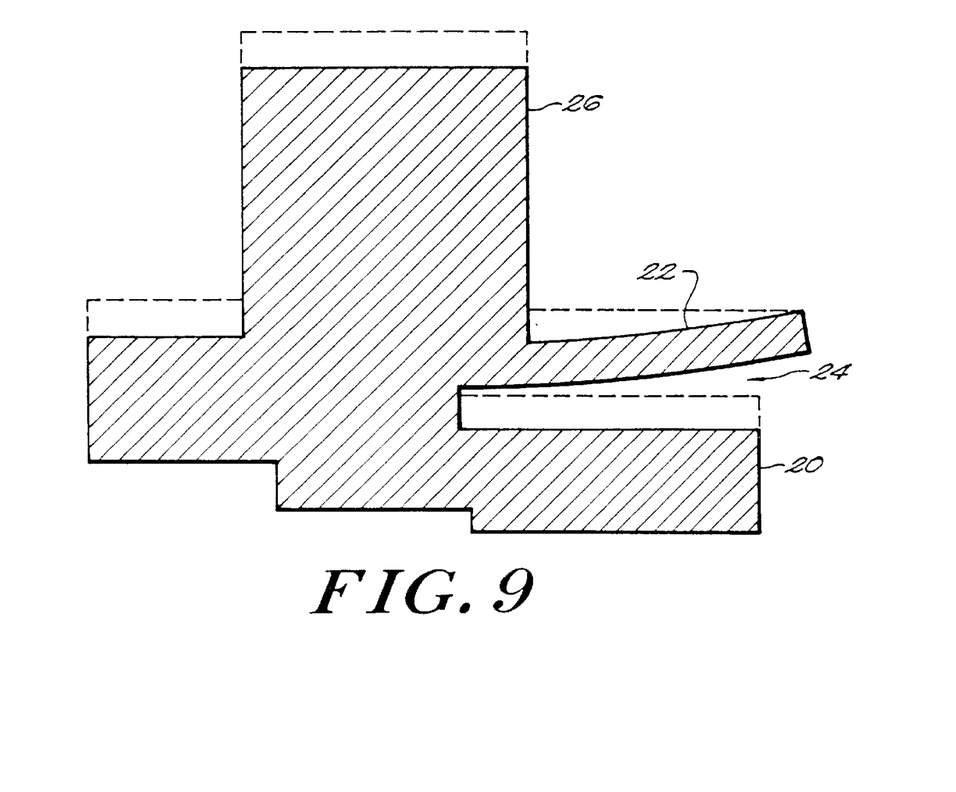
FIG. 9 is a detailed view corresponding to FIGS. 7 and 8 showing the housing structure in a deformed position.

With reference to FIG. 9 which identifies dimensions on the housing 12, several relationships between the dimensions have been found to produce a significant improvement in the degree of isolation provided by the housing structure 12 of the present invention.

Diameter E Relative to Diameter B.

Figure 10:
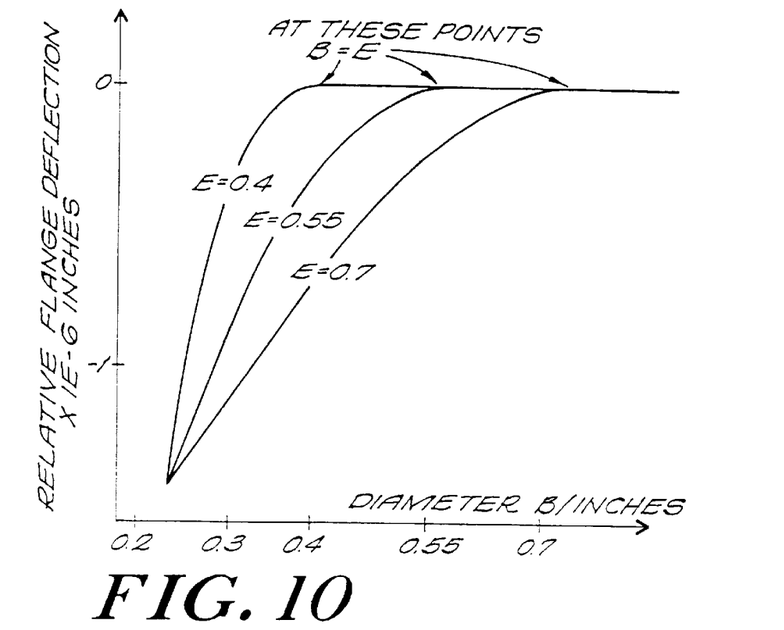
FIG. 10 is a graph showing the relationship between boss diameter B and relative flange deflection for three values of groove diameter E for the housing structure shown in FIGS. 1–9 when the housing is subjected to a barometric pressure variation of 1.5 inch of Mercury.
Figure 11:
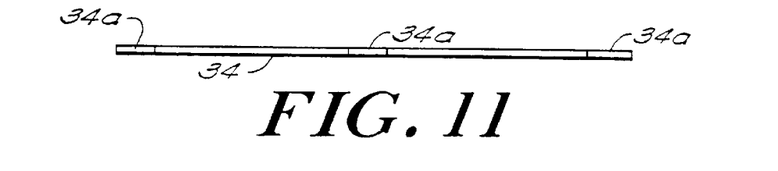
FIGS. 11 and 12 are views in side elevation and top plan of the shield plate shown in FIGS. 1 and 2.
Figure 12:
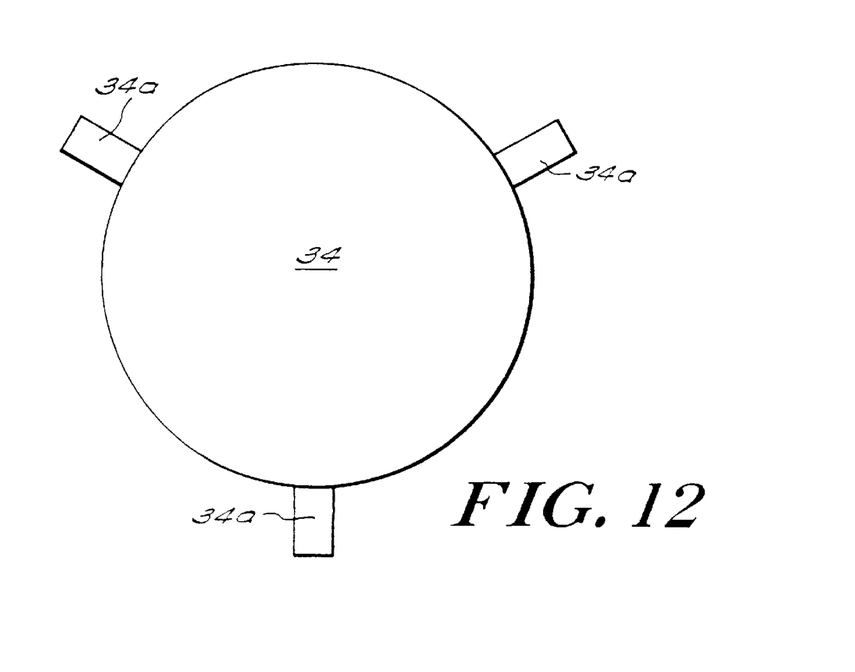

Generally, diameter B of the boss 26 must be greater than diameter E of the groove 24, measured from groove bottom groove bottom. FIG. 10 is a graph showing how the flange relative deflection is dramatically reduced as a function of the diameter E (the three plots). FIG. 10 also shows how the transition to a very small flange deflection occurs for three different values of diameter E. As the boss diameter B becomes smaller, the transition (slope of the graph) becomes much more pronounced. Therefore a small value of diameter E is preferred.

Diameter E Relative to the Diameter of the Diaphragm (Diameter F)

In the current invention the diameter F is preferably less than 4.00 inches. Larger diameters make the part unsuitable for the majority of pressure sensing applications, as well as increasing both the raw material costs and the machining costs.

For diameters less than 4.00 inches it has been found that the optimum value of diameter E is in the range 60–63% of diameter F. i.e. For diameter F of 2.00 inches diameter E should be 1.22 inches, and for diameter F of 4.00 inches diameter E should be 2.495 inches. It has been found that for diameter F>4.00 inches no further improvement is seen by increasing diameter E beyond 2.495 inches.

Height of Boss, H.

Considering the height of the raised boss 26, intuitively, the taller the part is the more rigid the part becomes and the barometric isolation is improved. However it has been found that there is a threshold above which little or no further improvement in performance is observed, i.e., when diameter F is 2.00 inch, the threshold for H is 0.70 to 1.00 inch. Below 0.7 inch performance is reduced. Above 1.00 inch the improvement in performance is small. This result is important from a commercial point of view because it means that length of round bar stock used to manufacture the part can be minimized, reducing the both the cost, size, and weight of the part.

More generally, it has been found that height H should be in the range of about 30% to about 50% of diameter F.

Thickness of Upper and Lower Flanges 20, 22 and Groove 24.

Figure 3:
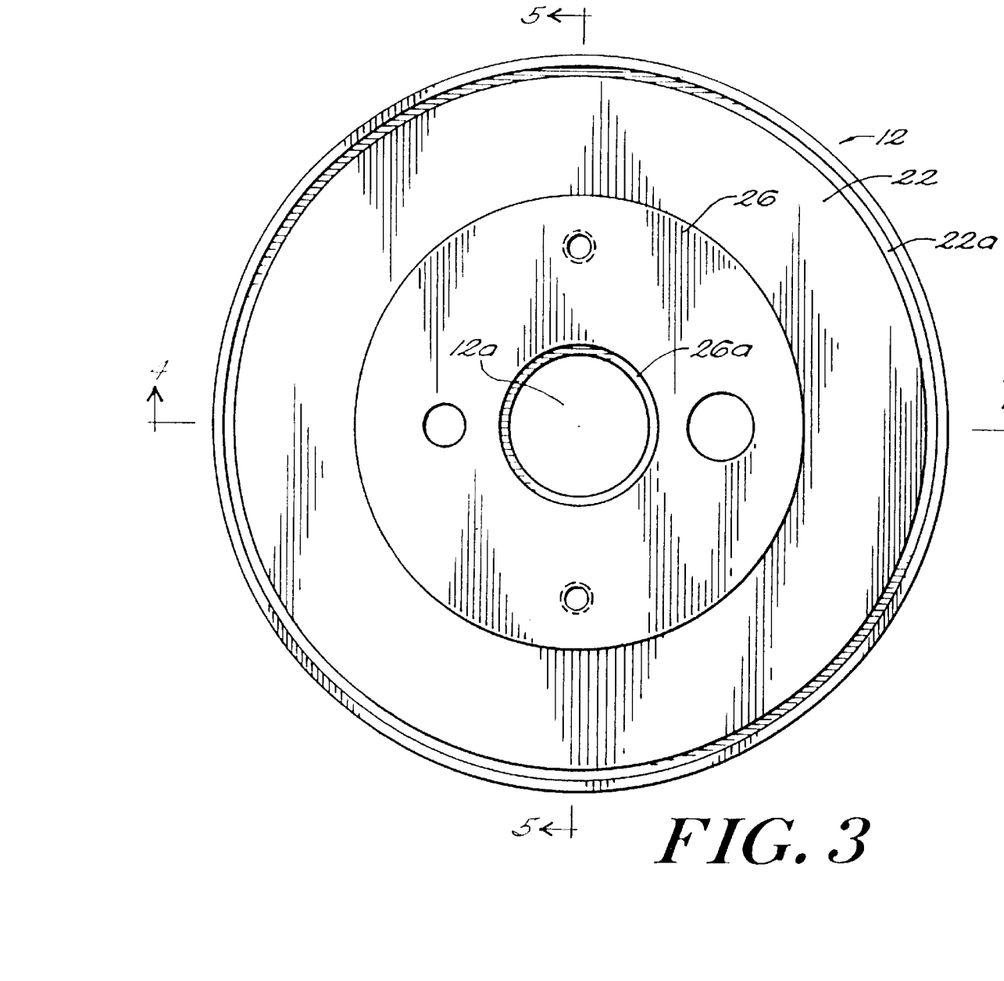
FIG. 3 is a top view of the housing structure according to the present invention shown in FIGS. 1 and 2.
Figure 4:
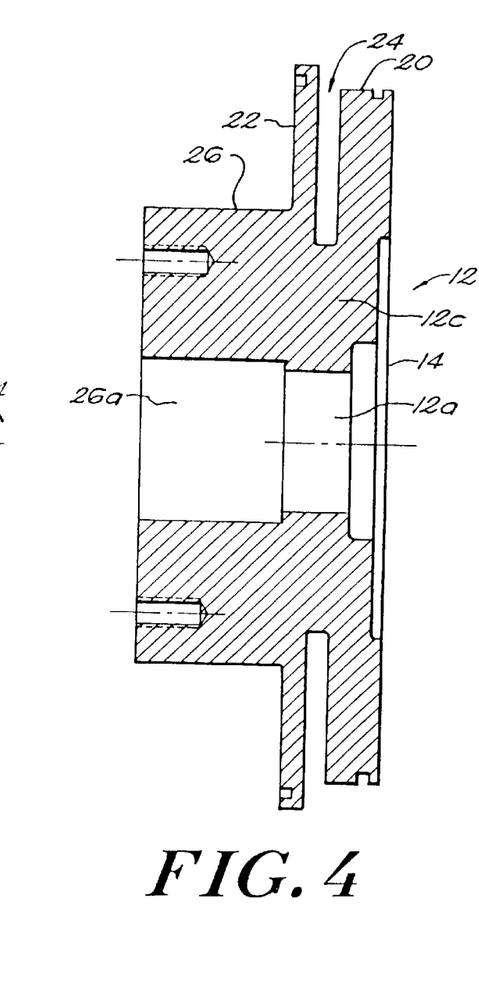
FIG. 4 is a view in section taken along the line 4—4 in FIG. 3.
Figure 5:
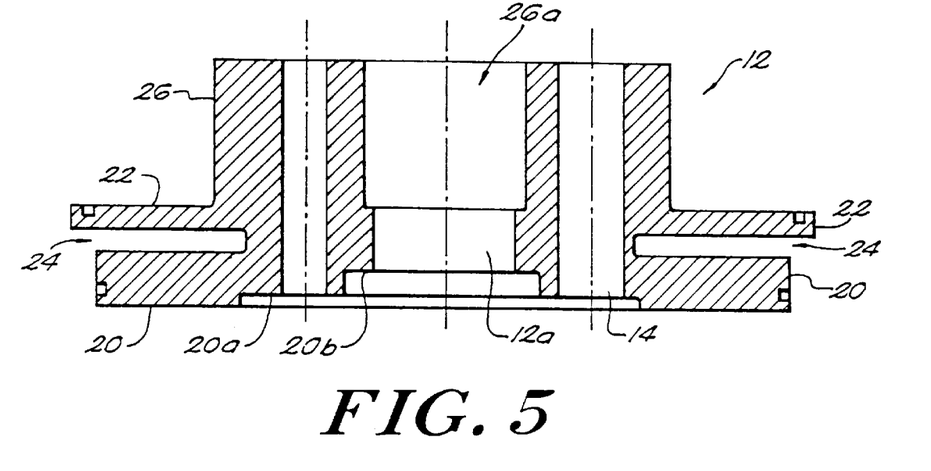
FIG. 5 is a view in section taken along the line 5—5 in FIG. 3.
Figure 6:
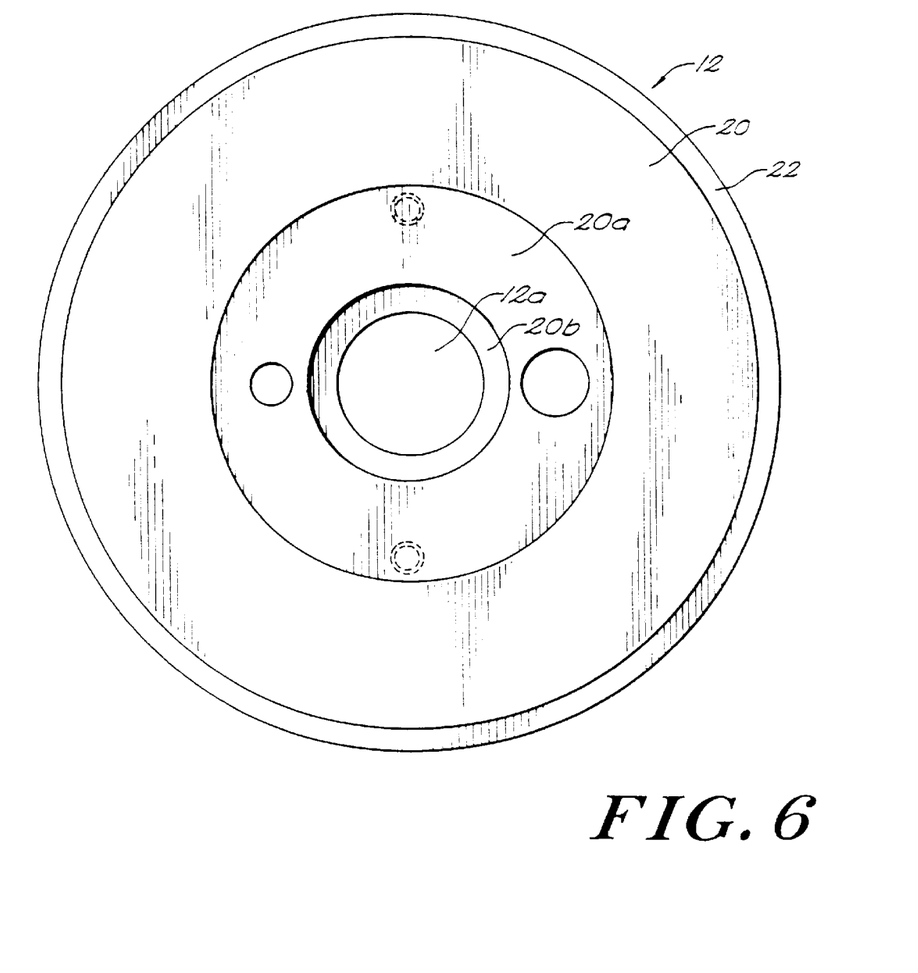
FIG. 6 is a bottom plan view of the housing structure shown in FIGS. 1–5.
Figure 7:
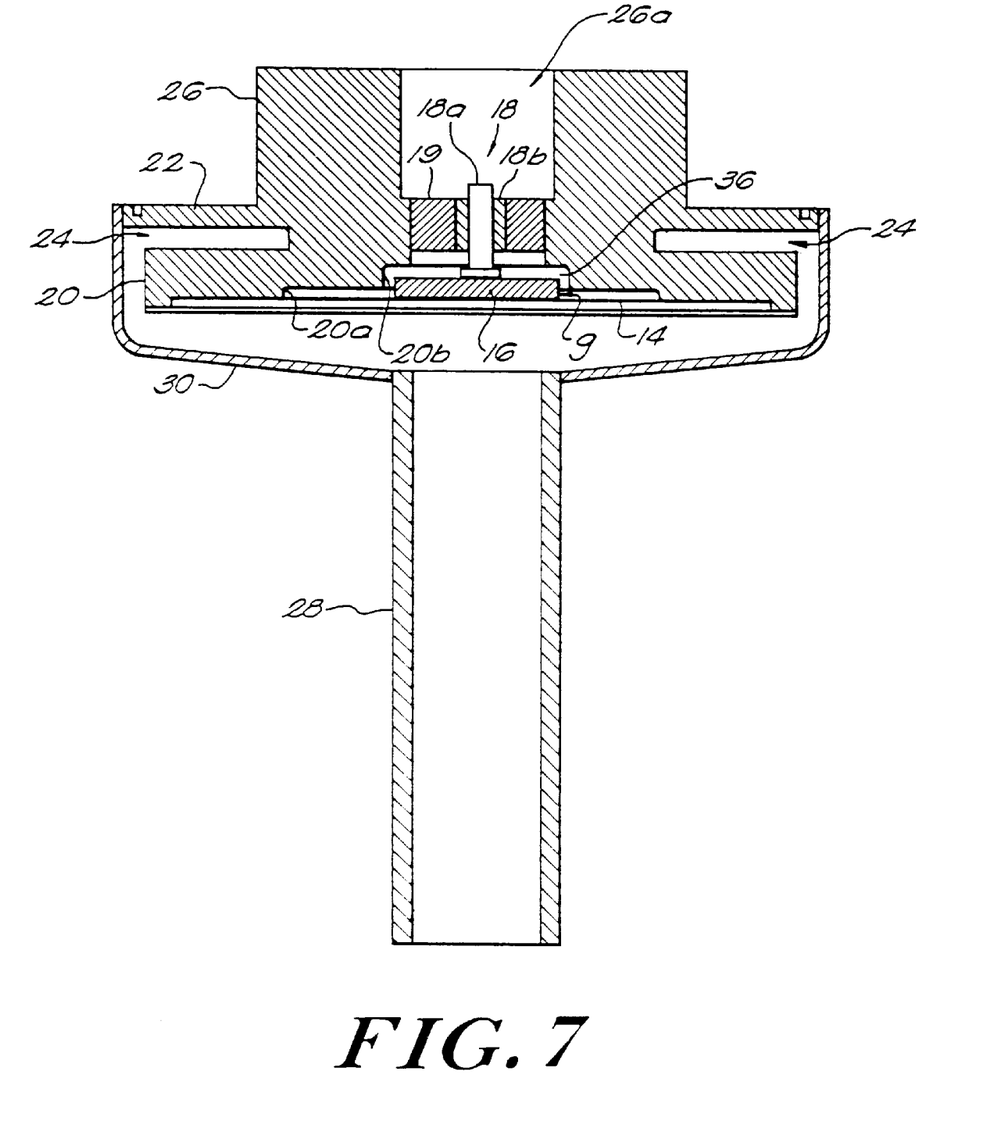
FIG. 7 is a simplified view in vertical section of the housing structure and the variable capacitor.

With reference to FIG. 3, it has been found that T1 is not the critical to the performance of the part, however both T2 and T3 are important. By way of illustration, but not of limitation, for a diameter F of 2.00 inch, T3 must be greater than 0.1 inch and T2 must be greater than 0.060 inch for optimum performance. More generally it has been found that T3 must be at least twice T2 for optimum performance. Allowing for the welding groove 20c, the actual preferred value in T3 in this example is 0.154 inch.

For a practical embodiment of the invention it is desirable to minimize the volume of chamber 32. A large volume increases the response time of the transducer to pressure and temperature changes in the system connected to tube 28. For this reason T1, T2 and T3 should be minimized, while maintaining the dimensional relationship discussed herein.

There has been described a capacitive transducer housing structure that provides a high degree of isolation of the diaphragm from changes in barometric pressure and mechanical stresses. The transducer using this housing structure is also compact.

While the invention has been described with reference to its preferred embodiments, it will be understood that various modifications and alterations will occur to those skilled in the art from the foregoing detailed description and the drawings. Those modifications and alterations are intended to fall within the scope of the appended claims.

What is claimed is:

1. A housing structure for a capacitive transducer that measures the pressure of a gas acting on one surface of a flexible, edge-mounted diaphragm by measuring the capacitance of the diaphragm and a conductive surface of an electrode spaced from the diaphragm by a gap g, the housing structure being sealed to a cover to form a first chamber over the diaphragm, comprising,
    a central structural member oriented transversely to a central axis and supporting the electrode,
    a first flange extending radially from said central structural member with an outer diameter F, said first flange mounting the diaphragm,
    a second flange extending radially from said central structural member having an outer diameter A,
    an annular groove spacing said first and second flanges having a thickness $T_2$ measured in the direction of the central axis, and having a diameter E measured across the bottom of the groove,
    a cylindrical boss having an outer diameter B that extends is aligned with and extends axially from the central structural member in a direction opposite from the diaphragm,
    said outer diameter B of said boss being at least equal to said groove diameter E,
    whereby the capacitive gap g is substantially isolated from stress applied to the housing structure.

2. The housing structure of claim 1 wherein said groove diameter E has a value that is about 60% of the value of said first flange outer diameter F.

3. The housing structure of claim 2 wherein the value of said diameter E is about 2.5 inch for values of said diameter F of 4.0 inch or greater.

4. The housing structure of claims 1 or 2 wherein the maximum height H of the housing structure measured along the central axis from the outside face of said boss to the outside face of said fast flange is in the range of about 30% to 50% of the value of said first flange diameter F.

5. The housing structure of claims 1, 2 or 4 wherein the thickness $T_3$ of said first flange measured in the direction of said central axis at its outer edge is at least about twice said groove thickness $T_2$.

6. The housing structure of claim 5 wherein for a value of said first flange diameter F of about 2.0 inch, said thickness $T_2$ is at least 0.60 inch and said thickness $T_3$ is at least 0.12 inch.

7. The housing structure of claim 1 wherein said boss contains a central counterbore and said central member secures a sealable vacuum conduit and a chemical getter assembly extending from said counterbore to a second chamber enclosed by said housing structure and the diaphragm.

8. The housing structure of claim 7 wherein said first flange has at least one counterbore in its outer face to accommodate said electrode.

9. The housing structure of claim 7 wherein said electrode comprises a conductive member, a conductive post transverse to said conductive member that supports the member and extends from the member and through the central member, and a dielectric material surrounding the post and secured within said central member.

10. The housing structure according to claim 7 wherein said region between the housing structure and the diaphragm is maintained at a high vacuum, the gas pressure to be measured is as low as $1 \times 10^{-5}$ Torr, and the electrode-to-diaphragm gap changes less than $1 \times 10^{-7}$ inch in response to movements of said housing structure in response to changes in ambient barometric pressure of as much as ±1.5 inch of Mercury.

* * * * *